United States Patent
Laaksonen (10) Patent No.: US 11,516,615 B2
(45) Date of Patent: Nov. 29, 2022

(54) AUDIO PROCESSING

(71) Applicant: Nokia Technologies Oy, Espoo (FI)

(72) Inventor: Lasse Laaksonen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/976,802

(22) PCT Filed: Feb. 27, 2019

(86) PCT No.: PCT/FI2019/050156
§ 371 (c)(1),
(2) Date: Aug. 31, 2020

(87) PCT Pub. No.: WO2019/166698
PCT Pub. Date: Sep. 6, 2019

(65) Prior Publication Data
US 2021/0006929 A1 Jan. 7, 2021

(30) Foreign Application Priority Data
Mar. 2, 2018 (GB) ..................................... 1803408

(51) Int. Cl.
*H04S 7/00* (2006.01)
*G06F 3/16* (2006.01)

(52) U.S. Cl.
CPC .............. *H04S 7/304* (2013.01); *H04S 7/301* (2013.01); *H04S 2400/13* (2013.01);
(Continued)

(58) Field of Classification Search
None
See application file for complete search history.

(56) References Cited

U.S. PATENT DOCUMENTS

2006/0152532 A1 7/2006 Sen .............................. 345/629
2009/0141905 A1* 6/2009 Warhol ................... H04S 1/002
381/61

(Continued)

FOREIGN PATENT DOCUMENTS

CN 102572676 A 7/2012
CN 103503503 A 1/2014
(Continued)

OTHER PUBLICATIONS

Murphy, David, et al., "Spatial Sound for Computer Games and Virtual Reality", Chapter 14, © 2011, IGI Global, pp. 287-312.
(Continued)

*Primary Examiner* — Qin Zhu
(74) *Attorney, Agent, or Firm* — Harrington & Smith (57) ABSTRACT

A method for rendering a spatial audio signal that represents a sound field in a selectable viewpoint audio environment that includes one or more audio objects associated with respective audio content and a respective position in the audio environment. The method includes receiving an indication of a selected listening position and orientation in the audio environment; detecting an interaction concerning a first audio object on basis of one or more predefined interaction criteria; modifying the first audio object and one or more further audio objects linked thereto; and deriving the spatial audio signal that includes at least audio content associated with the modified first audio object in a first spatial position of the sound field that corresponds to its position in the audio environment in relation to said selected listening position and orientation, and audio content associated with the modified one or more further audio objects.

21 Claims, 7 Drawing Sheets

(52) U.S. Cl.
CPC ....... *H04S 2400/15* (2013.01); *H04S 2420/01* (2013.01); *H04S 2420/05* (2013.01); *H04S 2420/11* (2013.01)

(56) References Cited

U.S. PATENT DOCUMENTS

| | | | |
|---|---|---|---|
| 2009/0262946 A1* | 10/2009 | Dunko | H04S 7/302 381/17 |
| 2010/0098275 A1* | 4/2010 | Metcalf | H04S 3/002 381/104 |
| 2015/0301592 A1 | 10/2015 | Miller | |
| 2016/0358364 A1 | 12/2016 | Goossens et al. | |
| 2017/0208416 A1 | 7/2017 | Petrov | 7/304 |
| 2017/0318407 A1* | 11/2017 | Meister | H04S 7/303 |
| 2018/0098173 A1* | 4/2018 | van Brandenburg | H04S 7/303 |
| 2018/0115849 A1* | 4/2018 | Breebaart | H04S 7/30 |
| 2018/0246698 A1* | 8/2018 | Huang | A63F 13/65 |

FOREIGN PATENT DOCUMENTS

| | | |
|---|---|---|
| CN | 104604255 A | 5/2015 |
| CN | 104919822 A | 9/2015 |
| CN | 105487230 A | 4/2016 |
| CN | 107024993 A | 8/2017 |
| CN | 107071688 A | 8/2017 |
| EP | 1 565 035 A2 | 8/2005 |
| EP | 1 565 035 A3 | 6/2010 |
| EP | 3011762 A1 | 4/2016 |
| WO | WO-2014/204997 A1 | 12/2014 |
| WO | WO 2017/182703 A1 | 10/2017 |

OTHER PUBLICATIONS

Huang, Kuo-Lun, et al., "An Object-Based Audio Rendering System using Spatial Parameters", The 1st IEEE Global Conference on Consumer Electronics, 2012, pp. 687-688.

* cited by examiner

Receive an indication of a selected listening position and orientation in a virtual audio environment
302

Detect an interaction concerning a first audio object on basis of one or more predefined interaction criteria
304

Modify, in response to the detected interaction concerning the first audio object, the first audio object and one or more further audio objects linked thereto
306

Derive a spatial audio signal that includes at least respective audio content associated with the modified first audio object and the modified one or more further audio objects in respective spatial positions of a sound field that correspond to their positions in the virtual audio environment in relation to the selected listening position and orientation
308

FROM 302

Detect an interaction concerning the first audio object based on one or more predeinfed interaction criteria defined in first interaction metadata defined for the first audio object
504

Identify the following from the first interaction metadata
- a first modification to be applied to the first audio object
- identification of one or more further audio objects
- one or more further modifications to be applied to the respective one or more further audio objects
510

Apply the first modification to the first audio object
512

Apply the one or more further modification to the respective one or more further audio objects
518

AUDIO PROCESSING

CROSS REFERENCE TO RELATED APPLICATION

This patent application is a U.S. National Stage application of International Patent Application Number PCT/FI2019/050156 filed Feb. 27, 2019, which is hereby incorporated by reference in its entirety, and claims priority to GB 1803408.2 filed Mar. 2, 2018.

TECHNICAL FIELD

The example and non-limiting embodiments of the present invention relate to rendering of free-viewpoint audio for presentation to a user. In particular, various embodiments of the present invention relate to implementing changes in a sound field rendered to a user resulting from interaction between a user and an audio source within free-viewpoint audio environment.

BACKGROUND

Free-viewpoint audio generally allows for a user to move and change his/her orientation (i.e. rotational position) around in a virtual audio environment and experience the sound field defined for the virtual audio environment in dependence of his/her location and orientation therein. While the term free-viewpoint audio is predominantly employed in this disclosure to refer to such a virtual audio environment, the same audio concept may be also referred to as free-listening point audio, six-degrees-of-freedom (6DoF) audio or volumetric audio. In some examples, free-viewpoint audio may be provided as audio-only environment e.g. as a stand-alone virtual audio system or as part of an augment reality (AR) or a mixed reality (MR) environment. In other examples, free-viewpoint audio may be provided as part of an audio-visual environment such as a virtual reality (VR) environment.

In general, the sound field of a virtual audio environment may rely on a plurality of audio sources or audio objects defined for the virtual audio environment. Typically, a given audio source/object is defined by respective audio content (provided e.g. as one or more digital audio signals) complemented by metadata assigned for the given audio source/object, where the metadata may define various characteristics of the audio content and/or the given audio source/object, including its position. The audio sources within the virtual audio environment may be represented, for example, as respective channel-based bed and audio objects, as respective first-order or higher-order Ambisonics (FOA/HOA) and audio objects, as respective audio objects only or by using any equivalent spatial audio representation. In some cases, a parametric immersive audio representation may be used, e.g., in combination with audio objects. A parametric immersive audio representation may consist, in part, of parameters describing, e.g., for a set of time-frequency tiles at least a direction, an energy ratio between a direction and directionless (or diffuse) audio, a spread coherence, a surround coherence or distance with respect to a reference position and rotation in the virtual audio environment.

A virtual audio environment may include a high number of audio sources at respective positions of the virtual audio environment, rendering of which to the user may depend on, for example, the user's location and orientation with respect to the audio sources. Typically, the sound field available at the user current position in view of his/her current orientation involves a spatial sound that includes one or more directional sound sources, possibly together with ambient sound component, which may be reproduced to the user, for example, as a binaural (stereo) audio signal via headphones or by using a multi-channel audio reproduction system. The user moving in the virtual audio environment may involve a change in the user's position with respect to one or more sound sources and/or a change in the user's orientation with respect to one or more sound sources. Hence, when moving in the virtual audio environment, for example, the user may move closer to one or more audio sources, the user may come into contact with one or more audio sources, the user may move away from one or more audio sources, the user may turn away from or towards one or more audio sources and/or new audio sources may appear or disappear due to a change in user's position and/or orientation—all of which result in changes in characteristics of the sound field rendered to the user.

User's movement bringing him/her close to or in contact with an audio source of the virtual audio environment serves as an example of the user interacting with the audio source within the virtual audio environment, while other types of interaction are likewise possible (e.g. such as the user touching, reaching out for, grabbing, moving, etc. the audio source itself or an object associated with the audio source especially in a VR scenario). One or more audio sources of a virtual audio environment may be arranged to react to user interaction therewith. As a few examples in this regard, an audio source of the virtual audio environment (e.g. in an AR, MR or VR scenario) may react to the user approaching or leaving immediate vicinity of the audio source, to the user turning towards or away from the location of the audio source and/or to the user otherwise interacting with the audio source. Straightforward examples of a reaction by an audio source to user interaction therewith include initiating or terminating the playback of the audio content associated with the audio source or modifying characteristics of audio content (such as amplitude) already being played back. Such reactions may be defined e.g. in the metadata assigned for the audio source.

Arranging at least some of the audio sources of a virtual audio environment reacting to user interaction enables defining more versatile virtual audio environments, e.g. ones that more readily resemble a real-world audio environment, which in many scenarios is a desired characteristic for a virtual audio environment. However, designing such interactions for a high number of audio sources of a virtual audio environment via their metadata elements such that a reasonable model of real-world-like behavior is provided is in many cases infeasible or even impossible due to time and effort it requires. Therefore, mechanisms that enable defining and implementing reactions arising from user interaction with audio sources of the virtual audio environment in a more flexible and versatile manner would be desirable e.g. in order to enable more efficient definition and implementation of more realistic virtual audio environments e.g. for AR, MR or VR systems.

SUMMARY

According to an example embodiment, a method for rendering a spatial audio signal that represents a sound field in a selectable viewpoint audio environment that includes one or more audio objects, wherein each audio object is associated with respective audio content and a respective position in the audio environment is provided, the method comprising receiving an indication of a selected listening position and orientation in the audio environment; detecting an interaction concerning a first audio object on basis of one or more predefined interaction criteria; modifying, in response to said detected interaction, the first audio object and one or more further audio objects linked thereto; and deriving the spatial audio signal that includes at least audio content associated with the modified first audio object in a first spatial position of the sound field that corresponds to its position in the audio environment in relation to said selected listening position and orientation, and audio content associated with the modified one or more further audio objects in respective further spatial positions of the sound field that correspond to their positions in the audio environment in relation to said selected listening position and orientation.

According to another example embodiment, an apparatus for rendering a spatial audio signal that represents a sound field in a selectable viewpoint audio environment that includes one or more audio objects, wherein each audio object is associated with respective audio content and a respective position in the audio environment is provided, the apparatus configured to: receive an indication of a selected listening position and orientation in the audio environment; detect an interaction concerning a first audio object on basis of one or more predefined interaction criteria; modify, in response to said detected interaction, the first audio object and one or more further audio objects linked thereto; and derive the spatial audio signal that includes at least audio content associated with the modified first audio object in a first spatial position of the sound field that corresponds to its position in the audio environment in relation to said selected listening position and orientation, and audio content associated with the modified one or more further audio objects in respective further spatial positions of the sound field that correspond to their positions in the audio environment in relation to said selected listening position and orientation.

According to another example embodiment, an apparatus for rendering a spatial audio signal that represents a sound field in a selectable viewpoint audio environment that includes one or more audio objects, wherein each audio object is associated with respective audio content and a respective position in the audio environment is provided, the apparatus comprising means for receiving an indication of a selected listening position and orientation in the audio environment; means for detecting an interaction concerning a first audio object on basis of one or more predefined interaction criteria; means for modifying, in response to said detected interaction, the first audio object and one or more further audio objects linked thereto; and means for deriving the spatial audio signal that includes at least audio content associated with the modified first audio object in a first spatial position of the sound field that corresponds to its position in the audio environment in relation to said selected listening position and orientation, and audio content associated with the modified one or more further audio objects in respective further spatial positions of the sound field that correspond to their positions in the audio environment in relation to said selected listening position and orientation.

According to another example embodiment, an apparatus for rendering a spatial audio signal that represents a sound field in a selectable viewpoint audio environment that includes one or more audio objects, wherein each audio object is associated with respective audio content and a respective position in the audio environment is provided, wherein the apparatus comprises at least one processor; and at least one memory including computer program code, which when executed by the at least one processor, causes the apparatus to: receive an indication of a selected listening position and orientation in the audio environment; detect an interaction concerning a first audio object on basis of one or more predefined interaction criteria; modify, in response to said detected interaction, the first audio object and one or more further audio objects linked thereto; and derive the spatial audio signal that includes at least audio content associated with the modified first audio object in a first spatial position of the sound field that corresponds to its position in the audio environment in relation to said selected listening position and orientation, and audio content associated with the modified one or more further audio objects in respective further spatial positions of the sound field that correspond to their positions in the audio environment in relation to said selected listening position and orientation.

According to another example embodiment, a computer program is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Throughout this disclosure the term (virtual) audio environment is employed to refer to a virtual environment that covers a plurality of positions or locations and that has a plurality of audio objects defined therefor. Such a virtual environment may span, for example, a two-dimensional or a three-dimensional space having respective predefined size across each of its dimensions. The audio objects included in the virtual audio environment each have their respective position therein. The position of an audio object within the virtual audio environment may be fixed or it may change or be changed over time. An audio object may further have an orientation with respect to one or more reference points (or reference directions) in the audio environment. Like the position, also the orientation of the audio object may be fixed or it may change or be changed over time. The orientation may serve to define the direction of the sound emitted by the audio object. In case no orientation is defined for an audio object, the respective audio object may apply a predefined default orientation or it may be considered as an omnidirectional audio object.

The term audio object as used in this disclosure does not refer to an element of a certain audio standard or audio format, but rather serves as a generic term that refers to an audio entity within the virtual audio environment. An audio object may be alternatively referred e.g. to as an audio source or as an audio item. An audio object is associated with audio content and a position in the virtual audio environment. In an example, an audio object may be defined via a data structure that includes the audio content and one or more attributes or parameters that at least define one or more spatial and operational characteristics of the audio object. As an example in this regard, an audio object is provided with one or more attributes or parameters that define the (current) position of the audio object within the virtual audio environment. As another example, the audio object may be provided with one or more attributes that define format of the audio content (e.g. length/duration, sampling rate, number of audio channels, audio encoding format applied therefor, etc.). The audio content of an audio object may be provided, for example, as a digital audio signal, whereas the one or more attributes of the audio object may be provided as metadata associated with the audio object and/or the audio content. The metadata may be provided using any applicable predefined format. Further aspects pertaining to audio objects of the virtual audio environment are described later in this disclosure via a number of examples.

In an example, the metadata associated with an audio object may include a content part and a format part. Therein, the content part may serve to describe what is contained in the audio and it may include e.g. the audio content associated with the audio object. The format part may serve to describe technical characteristics of the audio object that allows desired (and correct) rendering of the audio content associated with the audio object.

Herein, the term 'associated with' is applied to describe the relationship between the audio object and the audio content as well as the relationship between the audio object and the metadata (and any parameters or attributes included therein). However, this relationship may be also described as audio content and/or metadata defined for the audio object or as audio content and/or metadata assigned for the audio object.

In general, such a virtual audio environment serves as an example of a selectable viewpoint audio environment or a free-viewpoint audio environment that allows for a user to move around and/or change his/her orientation in the virtual audio environment and experience the sound field available therein in dependence of his/her location and orientation in the virtual audio environment. Hence, while the following description predominantly uses the term virtual audio environment, it is to be construed in a non-limiting manner, encompassing various types of selectable viewpoint audio environments that may be provided or referred to, for example, as free-listening point audio, six-degrees-of-freedom (6DoF) audio or volumetric audio. Typically, an audio environment is provided as part of an augmented reality (AR), a mixed reality (MR) or a virtual reality (VR) system, whereas a stand-alone audio environment is also possible.

Figure 1A:
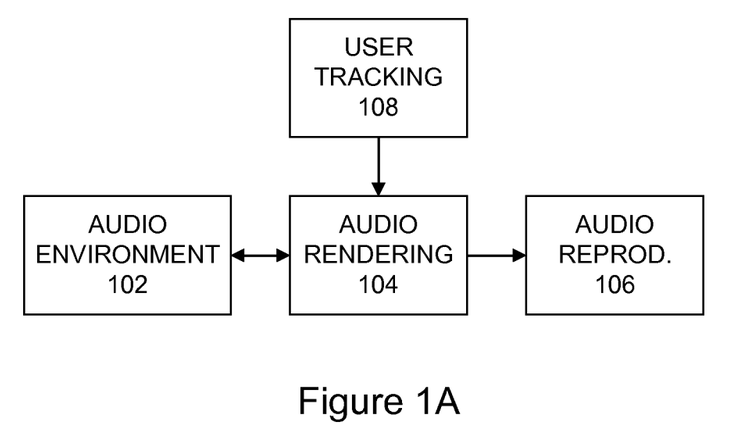
FIG. 1A illustrates a block diagram of some logical entities of an arrangement for rendering a sound field in a selected position of a virtual audio environment for a user according to an example.

According a non-limiting example, a virtual audio environment may be provided as part of an AR or MR system or the virtual audio environment may serve as an AR or MR system. FIG. 1A illustrates a block diagram of some logical entities of an arrangement for rendering a sound field in a selected position of a virtual audio environment 102 for a user in context of an AR or MR system. In this usage scenario an audio rendering engine 104 is arranged to provide a predefined mapping between positions or locations of a predefined real-world-space and corresponding positions or locations of the virtual audio environment 102. The position and/or orientation of a user in the real-world-space are tracked using applicable user tracking means 108 known in the art, which user tracking means 108 operates to extract one or more indications of the user's position and/or orientation in the real world that are provided as input data to the audio rendering engine 104. The audio rendering engine 104 operates to derive position and/or orientation of the user in the audio environment 102 based on the input data in view of the predefined mapping. The audio rendering engine 104 creates one or more spatial audio signals for reproduction to the user on basis of one or more audio objects of the audio environment 102 in dependence of the derived position and/or orientation of the user in the audio environment 102 such that the created one or more spatial audio signals represent the sound field in accordance with the derived position and/or orientation of the user in the audio environment 102. The audio rendering engine 104 further provides the created one or more spatial audio signals for reproduction to the user by the audio reproduction means 106. Such an arrangement for reproducing the audio environment to a user to provide an AR or MR system may be provided e.g. for a building or part thereof (such as a department store, a shopping mall, a hotel, an office building, a museum, a hospital, etc.) or for a predefined outdoor area (such as a park, an amusement park, etc.).

Figure 1B:
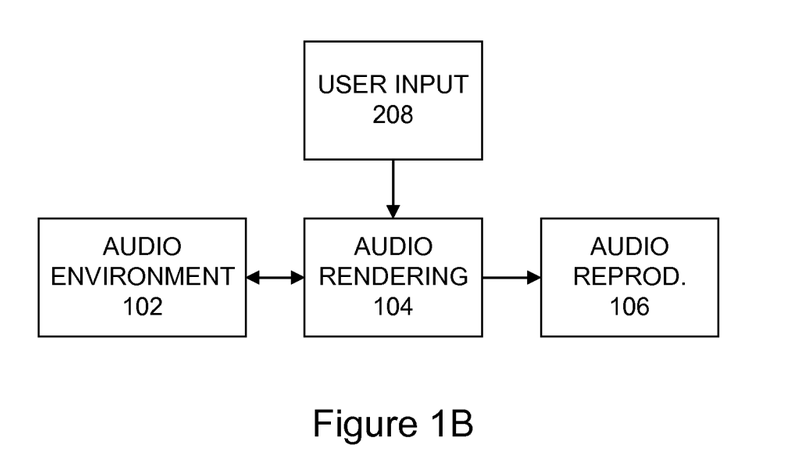
FIG. 1B illustrates a block diagram of some logical entities of an arrangement for rendering a sound field in a selected position of a virtual audio environment for a user according to an example.

In another non-limiting example, a virtual audio environment may be provided as part of a VR system that also involves a visual component. FIG. 1B illustrates a block diagram of some logical entities of an arrangement for rendering a sound field in a selected position of the virtual audio environment 102 for a user in context of a VR system. In such a usage scenario the location within the virtual audio environment typically have no correspondence to any physical (real-world) locations but the audio rendering engine 104 is arranged to provide a predefined mapping between positions or locations of a virtual world and corresponding positions or locations of the virtual audio environment 102. The position and/or orientation of a user in the virtual world are tracked or defined via user commands or controls received via user input means 208, while the audio rendering engine 104 operates to derive position and/or orientation of the user in the virtual audio environment 102 based on the user commands/controls in view of the predefined mapping. As described in the forgoing for the arrangement of FIG. 1A, the audio rendering engine 104 creates one or more spatial audio signals for reproduction to the user on basis of one or more audio objects of the virtual audio environment 102 in dependence of the derived position and/or orientation of the user in the virtual audio environment 102 such that the created one or more spatial audio signals represent the sound field in accordance with the derived position and/or orientation of the user in the virtual audio environment 102. The audio rendering engine 104 further provides the created one or more spatial audio signals for reproduction to the user by the audio reproduction means 106. Such a VR system may be provided e.g. for a virtual world for captured or computer-generated content. As an example in this regard, a tour in a virtual museum or exhibition may be provided to a user via a VR system.

In general, the audio rendering engine 104 operates to from a spatial audio signal that represents the sound field that reflects the current position and/or orientation of the user in the virtual audio environment 102, which spatial audio signal is provided for the audio reproduction means 106 for playback to the user. The spatial audio signal may comprise, for example, a two-channel binaural (stereo) audio signal (for headphone listening) or a multi-channel signal according to a suitable multi-channel layout (for listening via a loudspeaker system). The sound field represented by the spatial audio signal may involve zero or more directional sound sources at respective spatial positions of the sound field such that they correspond to respective locations of the zero or more currently active audio objects in view of the position and/or orientation of the user in the virtual audio environment 102. Each of the zero or more directional sound sources may be rendered in the sound field at a respective relative amplitude (e.g. loudness, signal level) that may be at least in part set or adjusted to reflect the distance between the current user position in the virtual audio environment 102 and the position of the respective audio object, e.g. such that attenuation applied to amplitude of a certain sound source increases with increasing distance between the user and the sound source. Various techniques for arranging a sound source in a desired spatial position of a sound field and for forming a combined spatial audio signal that includes multiple sound sources in respective spatial positions of the sound field are known in the art and a suitable such technique may be employed herein. For example, in case of binaural presentation a head-related transfer function (HRTF) filtering or another corresponding technique may be utilized.

Spatial characteristics of the sound field to be rendered to the user may vary e.g. due to change in the user's position and/or orientation (i.e. due to movement of the user), due to movement of one or more currently active audio objects, due to movement of the virtual audio scene in its entirety (with respect to the user's position), due to activation of one or more further audio objects and/or due to deactivation of one or more currently active audio sources. Consequently, the audio rendering engine 104 may operate to regularly update the spatial characteristics of the sound field rendered to the user (e.g. spatial positions of the sound sources therein) to reflect the current position and/or orientation of the user in the virtual audio environment 102 in view of the current positions of the currently active audio objects therein.

At least some of the audio objects of the virtual audio environment 102 are interactive objects that are arranged to respond to a user directly interacting with the respective audio object and/or to respond to the user indirectly interacting with the respective audio object via one or more intervening audio objects. Herein, a response by an audio object involves a modification applied in the audio object. The modification may be defined, for example, in metadata assigned for or associated with the audio object. The modification may concern, for example, the position of the audio object in the virtual audio environment 102 and/or characteristics of the audio content, as will be described in more detail via examples provided later in this disclosure. A response by an audio object may be implemented by the audio rendering engine 102 by creating or modifying one or more spatial audio signals that represent the sound field in accordance with the derived position and/or orientation of the user in the virtual audio environment 102 and in view of the modifications applied to the audio object.

In this regard, the virtual audio environment 102 may include audio objects that are arranged for interactions and/or responses of one or more of the following types.

Individual interaction: An audio object may be arranged to respond to a user interacting with the audio object such that the response is independent of the user interacting (simultaneously or in the past) to another audio object of the virtual audio environment 102.

Connected interaction: A first audio object may be arranged to respond to a user interacting with the audio object and one or more second objects may be arranged to respond to the response invoked in the first audio object. Hence, a response invoked in the first audio object may be considered as interaction of the first audio object with the one or more second audio objects that are arranged to react accordingly. Moreover, respective one or more third audio objects may be arranged to respond to the response invoked in respective one of the second audio objects and so on. Conceptually, two different types of connected interactions may be considered:
a first level connected interaction may be invoked in a second audio object as a consequence of a response caused in the first audio object in response to user interacting with the first audio object;
a second level connected interaction may be invoked in a third or subsequent audio object as a consequence of a response caused in another audio object due to a sequence of two or more connected interactions (a first level connected interaction followed by one or more second level connected interactions) initiated by the user interacting with the first audio object.

Hence, a first level connected interaction may invoke a respective sequence of zero or more second level connected interactions in one or more other audio objects connected thereto. If an audio object is arranged for both individual interaction and connected interaction, respective responses caused by the two interactions may be similar to each other or may be different from each other.

Group interaction: A first audio object and one or more second objects may be arranged to jointly respond to a user interacting with the first audio object. If an audio object is arranged for both individual interaction and group interaction, respective reactions caused by the two interactions are preferably different from each other. Moreover, if an audio object is arranged for both connected interaction and group interaction, respective reactions caused by the two interactions are preferably also different from each other.

Each of the connected interaction and the group interaction may be controlled via metadata. The information that defines the respective interaction may be provided in metadata assigned for or associated with an audio object of the virtual audio environment 102 and/or in metadata assigned for or associated with a dedicated audio control object included in the virtual audio environment 102. The audio control object may be provided, for example, as a specific object type of the virtual audio environment 102 or as an audio object that is associated with an empty audio content.

Detection of an interaction between a user and an audio object may involve considerations concerning spatial relationship between the user and the audio object in the virtual audio environment 102. This may involve the audio rendering engine 104 determining whether the user is in proximity of the audio object in dependence of position and/or orientation of the user in the virtual audio environment 102 in relation to the position of the audio object in the virtual audio environment 102. The audio rendering engine 104 may consider the user to interact with the audio object in response to the user being in proximity of the audio object in the virtual audio environment 102. Non-limiting examples in this regard are provided in the following:

A user may be considered to be in proximity of an audio object in response to the distance between position of the user and that of the audio object being below a predefined threshold distance.

A user may be considered to be in proximity of an audio object in response to the distance between position of the user and that of the audio object being below a predefined threshold distance and the audio object being oriented towards the position of the user.

A user may be considered to be in proximity of an audio object in response to the distance between position of the user and that of the audio object being below a predefined threshold distance and the user being oriented towards the position of the audio object.

A user may be considered to be in proximity of an audio object in response to the distance between position of the user and that of the audio object being below a predefined threshold distance, the user being oriented towards the position of the audio object and the audio object being oriented towards the position of the user.

As can been seen in the above examples, the orientation possibly defined for an audio object may be considered separately from the user's orientation with respect to the position of the sound source.

There may also be another spatial relationship between the user's position with respect to an audio object: the virtual audio environment 102 may define a default attenuation for a sound originating from an audio object as a function of the distance between the position of the user and the position of the audio object such that the attenuation increases with increasing distance. The default attenuation may be defined separately (and possibly differently) for a plurality of frequency sub-bands or the default attenuation may be the same across the frequency band. In an example, the default attenuation defines a default audio presentation level that applies to all audio objects of the virtual audio environment 102. In other examples, the default attenuation may be jointly defined for a subsets of audio objects or the default attenuation may be defined individually for one or more (or even all) audio objects of the virtual audio environment 102. Typically, the default attenuation that is applicable to a given audio object is separate from consideration of proximity of the user to the given audio object and any response that may arise therefrom.

In some examples, the spatial relationship property used to detect an interaction between a user and an audio object may hence be based on a default audio rendering volume level of an audio object to a user. When the default audio rendering of an audio object to a user at the current user position is above a threshold defined for the audio object (e.g. in interaction metadata associated with the audio object), an interaction is detected and the audio content associated with the audio object is rendered to the user according to the degree of interaction thus observed. According to this alternative implementation, the default audio rendering of said object is from that point forward used only for detecting whether the interaction is maintained until the interaction has ended. Only when the default audio rendering volume level of the audio object e.g. due to a positional change of at least the audio object or the user or for any other reason falls below the current threshold value is the default audio rendering again used for providing the audio object contribution to the overall audio presentation to the user.

In addition to the spatial relationship, the determination of interaction between a user and an audio object may further involve considerations concerning temporal aspects. As an example in this regard, the audio rendering engine 104 may consider the user to interact with the audio object in response to the user being in proximity of the audio object in the virtual audio environment 102 at least for a predetermined period of time.

Instead of or in addition to consideration of a temporal aspect, the detection of an interaction between a user and an audio object may involve considerations concerning user action addressing the audio object or an object associated with the audio object. As an example in this regard, the audio rendering engine 104 may consider the user to interact with an audio object in response to receiving one or more control input indicating a user action (e.g. one of one or more predefined user actions) addressing the audio object or an object associated with the audio object while the user is positioned in proximity of the audio object in the virtual audio environment 102. The event that causes providing such a control input is outside the scope of the present disclosure. However, in an AR or MR system such a control input may be triggered in response to a user touching or reaching out for a real-word object associated with the audio object (which may be detected and indicated, for example, by the user tracking means 108), whereas in a VR system such a control input (e.g. by the user input means 208) may be triggered in response to user touching or reaching out for a virtual-world object associated with the audio object.

In the following, a few non-limiting illustrative examples of a response invoked in an audio object in response to user interaction therewith are described. Even though the following examples refer to a response in singular, in general user interaction with an audio object may invoke a combination or a sequence of responses and/or two or more independent responses in the audio object under interaction.

In general, the response comprises a change or modification of some kind in status of the audio object in relation to the user. As an example, a response invoked in an audio object in response to a user interaction therewith may comprise activation of the audio object. This may involve the introducing a directional sound component on basis of the audio content associated with the audio object in the spatial audio signal that represents the sound field such that a spatial position of the sound component corresponds to the current position of the audio object in the virtual audio environment 102 in relation to the current position and/or orientation of the user in the virtual audio environment 102. As another example, a response invoked in an audio object in response to a user interaction therewith may comprise deactivation of the audio object, which may involve removing the directional sound component rendered on basis of the audio content associated with the audio object from the sound field.

As a further example, a response invoked in an audio object in response to user interaction therewith may comprise a change of amplitude (e.g. a change in signal level or loudness) of the directional sound component of the sound field that corresponds to the audio object. The change may involve decreasing the amplitude (e.g. increasing attenuation or decreasing gain) or increasing the amplitude (e.g. decreasing attenuation or increasing gain). In this regard, the example changes of amplitude may be defined and introduced in relation to a rendering amplitude that arises from operation of the default attenuation (described in the foregoing) defined for the audio object. As an example in this regard, a change of amplitude that may result from a user moving closer to the audio object (and thereby interacting with the audio object) may result in the audio content associated with the audio object being rendered to the user at a significantly higher signal level than that defined by the default attenuation, In another example, the user moving closer to an audio object (and thereby interacting therewith) may result in the audio content associated with the audio object being rendered to the user at a constant signal level or at a lower signal level despite the distance between the user and the audio object becoming smaller. In other words, in case there were no user interaction that invokes a response from an audio object, the rendering level (e.g. its volume) of the directional sound component represented by the audio object would reflect the general properties of the free viewpoint audio rendering, where for example moving closer to an audio source will generally result in an increase of the perceived loudness (but not the signal level of the audio source itself). An interaction between a user and an audio object may thus alter this dynamic.

As a yet further example, a response invoked in an audio object in response to the user interaction therewith may comprise a change in position of the audio object, which change of position results in change of the spatial position of the directional sound component of the sound field that corresponds to the audio object. The change of position may involve a one-time change from the current position to a defined target position. As a few examples in this regard, the change of position of the audio object may be defined to take place directly from the current position to the target position or it may be defined to take place via one or more intermediate positions over a specified time period. In another example, the change of position may involve a repeated or continuous change between two or more positions, e.g. at random or predefined time intervals.

The illustrative examples of the reaction invoked in an audio object due to the user interaction therewith described in the foregoing also serve as applicable examples of a reaction invoked in an audio object in response to a response invoked in another audio object of the virtual audio environment 102.

As described in the foregoing, the audio rendering engine 104 operates to render the sound field in the user's current position within the virtual audio environment 102 for the user as a spatial audio signal, where spatial characteristics of the spatial audio signal are regularly (e.g. at predefined intervals) updated to reflect the current position and/or orientation of the user in the virtual audio environment 102 in relation to the current positions of the currently active audio objects therein. In the following, we also refer to the position and orientation of the user in the virtual audio environment 102 as a selected position and orientation in the virtual audio environment 102.

Figure 2:
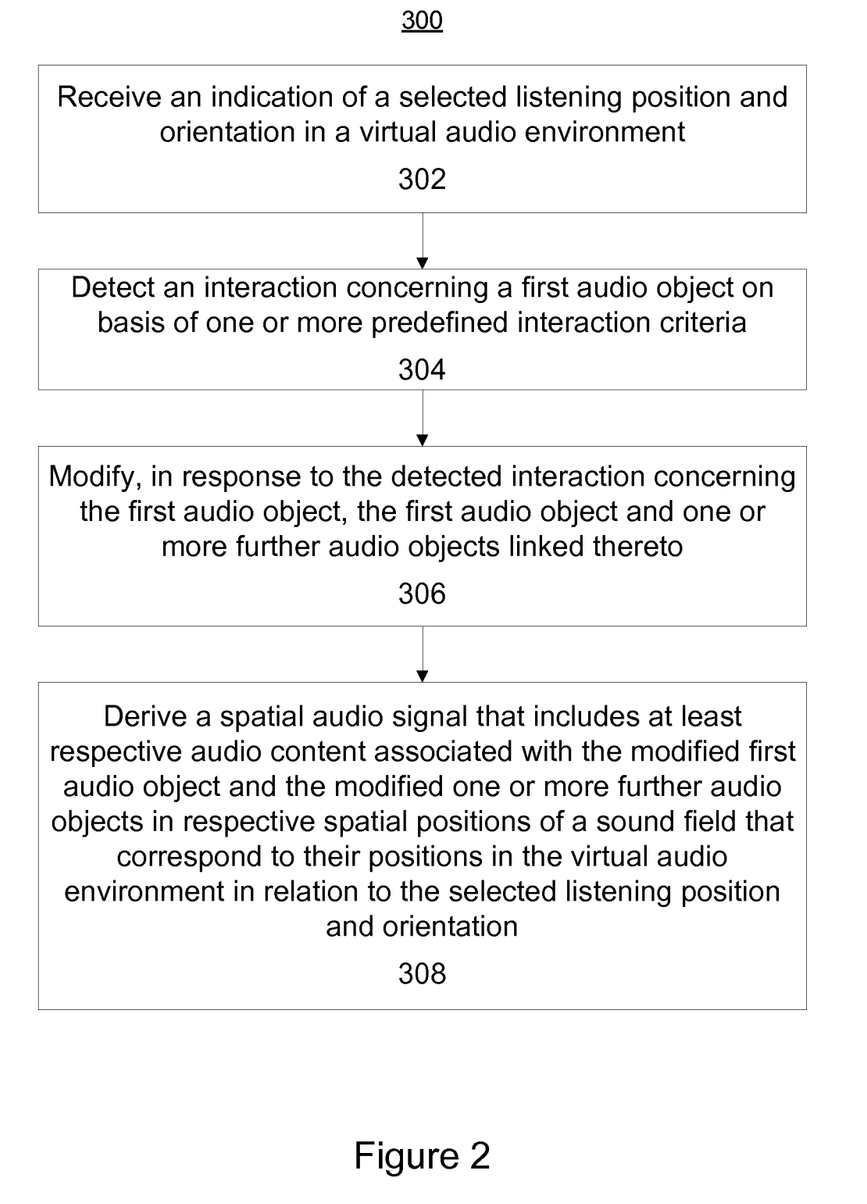
FIG. 2 illustrates a flow chart depicting a method for forming or modifying a spatial audio signal that represents a sound field in a virtual audio environment according to an example.

While forming or modifying the spatial audio signal, the audio rendering engine 104 may operate, for example, in accordance with a method 300 illustrated by a flowchart in FIG. 2. The method 300 may be implemented, for example, by the audio rendering engine 104. The method 300 commences by receiving an indication of a selected listening position and orientation in the virtual audio environment 102, as indicated in block 302. Such an indication may be received e.g. from the user tracking means 108 or from the control means 208, as described in the foregoing.

The method 300 further involves detecting an interaction concerning a first audio object of the virtual audio environment 102, as indicated in block 304. In an example, the interaction concerning the first audio object comprises an interaction between the first audio object and the selected listening position and orientation in the virtual audio environment 102 on basis of one or more predefined interaction criteria. In another example, the interaction concerning the first audio object involves an interaction between the first audio object and one or more further audio objects of the virtual audio environment 102.

The method 300 further comprises modifying the first audio object and one or more further audio objects that are linked thereto as a response to detecting the interaction concerning the first audio object, as indicated in block 306. The link between the first audio object and the one or more further audio objects may be defined, for example, via interaction metadata associated with the first audio object.

Finally, as indicted in block 308, the method 300 proceeds into deriving the spatial audio signal that includes at least one of the following:
audio content associated with the modified first audio object in a first spatial position of the sound field that corresponds to its position in the virtual audio environment 102 in relation to the selected listening position and orientation,
audio content associated with the modified second audio object in a second spatial position of the sound field that corresponds to its position in the virtual audio environment 102 in relation to the selected listening position and orientation.

In an example, derivation of the spatial audio signal involves creating the spatial audio signal that includes respective audio content associated with the modified first and/or second audio objects in their respective spatial positions of the sound field, e.g. such that the audio content originating from the modified first and/or second audio objects are the only directional sound sources of the sound filed. In another example, derivation of the spatial audio signal involves modifying the spatial audio signal such that it includes respective audio content associated with the modified first and/or second audio objects in their respective spatial positions of the sound field, e.g. such that the resulting modified spatial audio signal includes one or more further directional sound sources in addition to audio content originating from the modified first and/or second audio objects.

Figure 3:
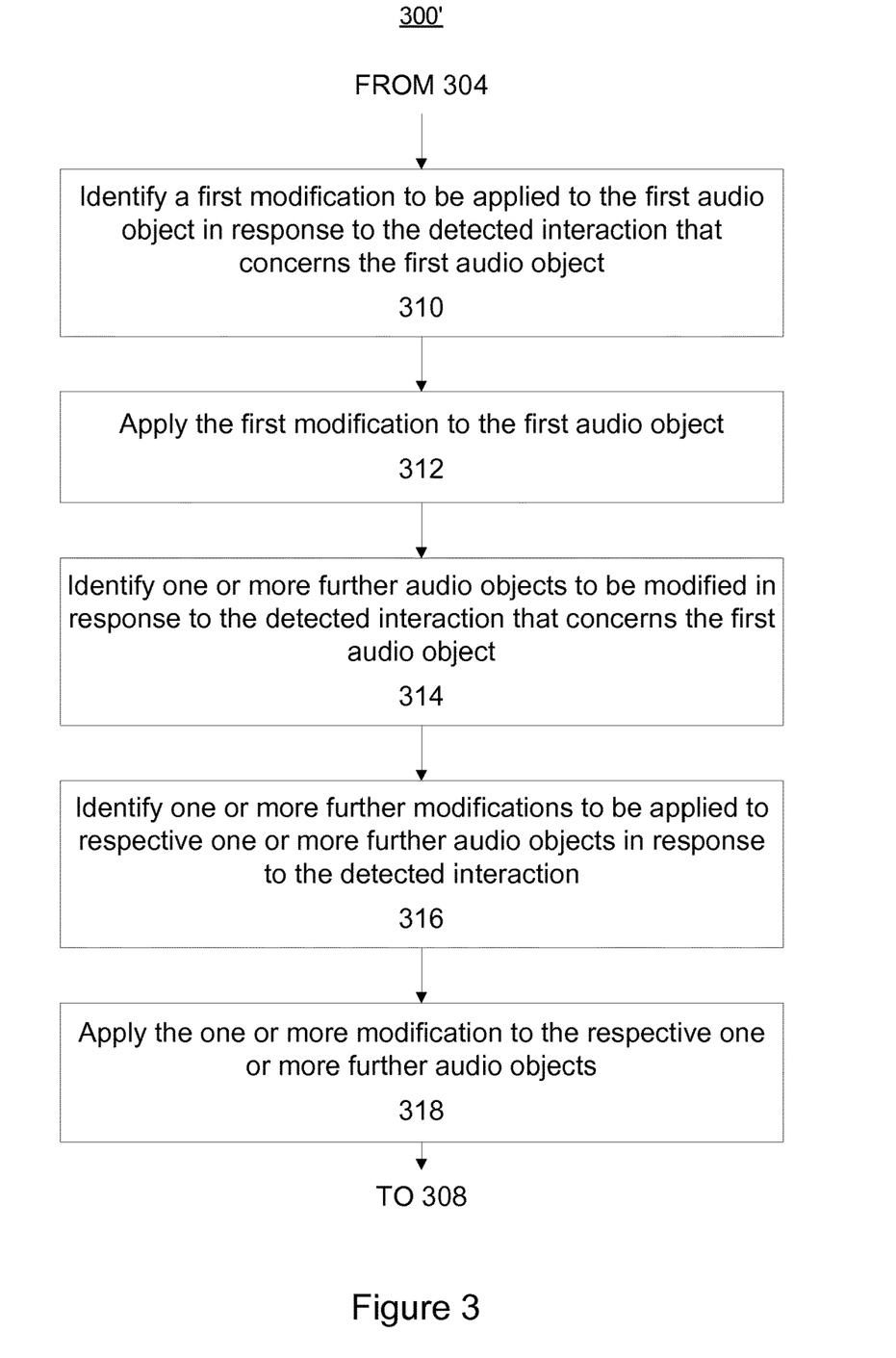
FIG. 3 illustrates a flow chart depicting method steps for forming or modifying a spatial audio signal that represents a sound field in a virtual audio environment according to an example.

As an example of providing operations described in the foregoing with references to block 306, the method 300 may include method steps 300' illustrated in a flowchart of FIG. 3. The method 300 in view of the method steps 300' may involve identifying a first modification to be applied to the first audio object in response the detected interaction that concerns the first audio object, as indicated in block 310, and applying the first modification to the first audio object, as indicated in block 312.

The method 300 in view of the method steps 300' further involves identifying one or more further audio objects to be modified in response to the detected interaction that concerns the first audio object, identifying one or more further modifications to be applied to the respective one or more further audio objects, and applying the identified one or more further modifications to the respective one or more further audio objects, as indicated in blocks 314, 316 and 318. The relationship between the first modification and the one or more further modifications may be e.g. one of the connected interaction and group interaction described in the foregoing. Illustrative examples regarding operations pertaining to blocks 310 to 316 are described in the following.

In various examples described in the foregoing, detection of an interaction and modification to be applied in the first and/or second audio objects as a consequence of detecting the interaction with the first audio object relies on metadata. For clarity of description, in the following we refer to such metadata as interaction metadata. Depending on the type of interaction, the interaction metadata may be provided as metadata associated with the first audio object, as metadata associated with one of the one or more further audio objects, as metadata associated with an audio control object, or as metadata associated with one or more of the first audio object, the one or more further audio objects and an audio control object. The interaction metadata may define the following aspects:

One or more interaction criteria that define an interaction with the first audio object;

One or more responses or modifications to be applied to the first audio object in response to detecting the interaction;

Identification of one or more further audio objects;

Respective one or more responses or modifications to be applied to the identified one or more further audio objects.

The exact format or syntax for implementing the above definitions in the interaction metadata may be chosen according to requirements of an underlying application or framework in which the virtual audio environment 102 is provided.

Non-limiting examples of distributing the interaction metadata between one or more of the interaction metadata associated with the first audio object, interaction metadata associated with the one or more further audio objects and/or interaction metadata associated with an audio control object for different types of interaction (connected interaction, group interaction) are provided in the following.

Figure 4A:
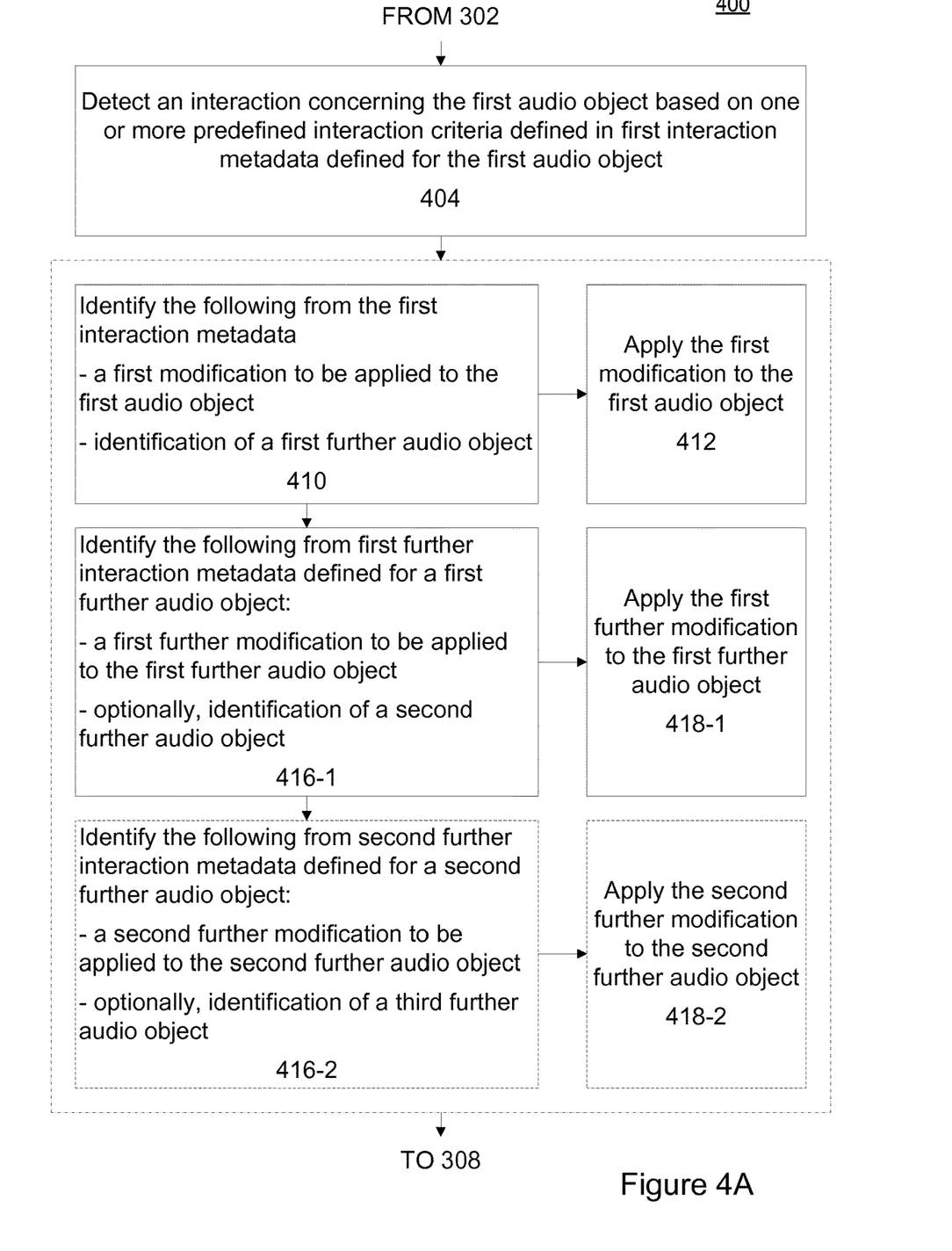
FIG. 4A illustrates a flow chart depicting method steps for forming or modifying a spatial audio signal that represents a sound field in a virtual audio environment according to an example.

As an example of providing operations described in the foregoing with references to blocks 304 and 306 on basis of respective interaction metadata associated with the first audio object and the one or more further audio objects, the method 300 may include method steps 400 illustrated in a flowchart of FIG. 4A, which method steps 400 may be considered to render the method 300 as an implementation of a connected interaction between the first audio object and the one or more further audio objects. The method 300 in view of the method steps 400 may involve detecting interaction concerning the first audio object based on one or more predefined interaction criteria defined in first interaction metadata associated with the first audio object, as indicated in block 404. In an example, the interaction concerning the first audio object comprises an interaction between the first audio object and the selected listening position and orientation in the virtual audio environment 102, whereas in another example the interaction concerning the first audio object involves an interaction between the first audio object and one or more further audio objects of the virtual audio environment 102.

The method 300 in view of the method steps 400 may further involve identifying the first modification to be applied to the first audio object and a first further audio object from the first metadata associated with the first audio object, as indicated in block 410. As indicated in block 412, and the method may further involve applying the first modification to the first audio object. The method 300 in view of the method steps 400 may further include identifying a first further modification to be applied to the first further audio object and, optionally, a second further audio object from first further interaction metadata associated with the first further audio object, as indicated in block 416-1. The method may further involve applying the first further modification to the first further audio object, as indicated in block 418-1.

In case the first further metadata includes the identification of the second further audio object, the method 300 in view of the method steps 400 may further continue by identifying, from second further interaction metadata associated with the second further audio object, a second further modification to be applied to the second further audio object and, optionally, by identifying a third further audio object, as indicated in block 416-2. The method further proceeds into applying the first further modification to the first further audio object, as indicated in block 418-2.

As an example, in context of the method steps 400 the first audio object may be associated with the first interaction metadata that includes a definition of one or more interaction criteria that specify an interaction between the first audio object and the selected position and orientation, definition of a first modification to be applied to the first audio object in response to detected interaction, and an identification of a first further audio object, whereas the first further audio object may be associated with the first further interaction metadata that includes a definition of a first further modification to be applied to the first further audio object in response to the detected interaction with the first audio object. Moreover, the first further interaction metadata may optionally include an identification of a second further audio object, and the second further audio object may be associated with second further interaction metadata that includes a definition of a second further modification to be applied to the second further audio object and, again optionally, an identification of a third further audio object. Such linkage of audio objects may be applied to provide connected interaction that involves the first audio object and one or more further audio objects up to any desired number of further audio objects.

Figure 4B:
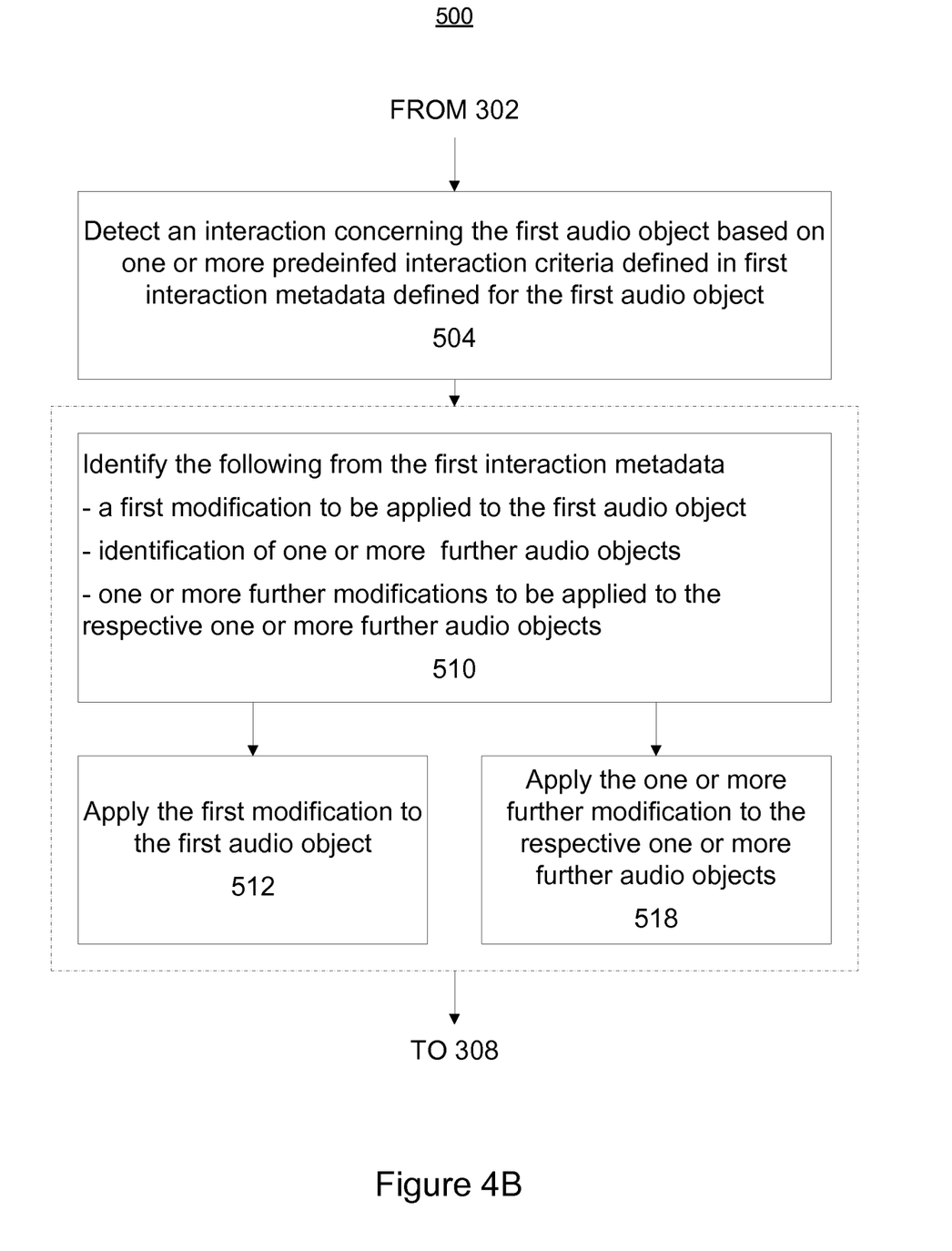
FIG. 4B illustrates a flow chart depicting method steps for forming or modifying a spatial audio signal that represents a sound field in a virtual audio environment according to an example.

As an example of providing operations described in the foregoing with references to blocks 304 and 306, the method 300 may include method steps 500 illustrated in a flowchart of FIG. 4B, which method steps 500 may be considered to render the method 300 as an implementation of a group interaction that involves the first audio object and one or more further audio objects. In this regard, the method comprises detecting an interaction concerning the first audio object based on one or more predefined interaction criteria defined in first interaction metadata associated with the first audio object, as indicated in block 504. In an example, the interaction concerning the first audio object comprises an interaction between the first audio object and the selected listening position and orientation in the virtual audio environment 102, whereas in another example the interaction concerning the first audio object involves an interaction between the first audio object and one or more further audio objects of the virtual audio environment 102.

The method 300 in view of the method steps 500 may further involve identifying the first modification to be applied to the first audio object, one or more further audio objects and respective one or more further modifications from the first metadata associated with the first audio object, as indicated in block 510. The method 300 in view of the method steps 500 may further involve applying the first modification to the first audio object, as indicated in block 512, and applying the one or more further modifications to the respective one or more further audio objects, as indicated in block 518.

As an example, in context of the method steps 500 the first audio object may be associated with the first interaction metadata that includes a definition of one or more interaction criteria that define an interaction between the first audio object and the selected position and orientation, definition of a first modification to be applied to the first audio object in response to the detected interaction, respective identifications of the one or more further audio objects, and respective definitions of one or more further modifications to be applied to the one or more further objects in response to the detected interaction.

In an example in context of the method steps 500, the first audio object may be provided as a regular audio object that is associated with a non-empty audio content.

In another example, the first audio object may be provided as an audio control object associated with empty audio content, the audio control object thereby serving as a control point for the group interaction by the first audio object and the one or more further audio objects.

Figure 5A:
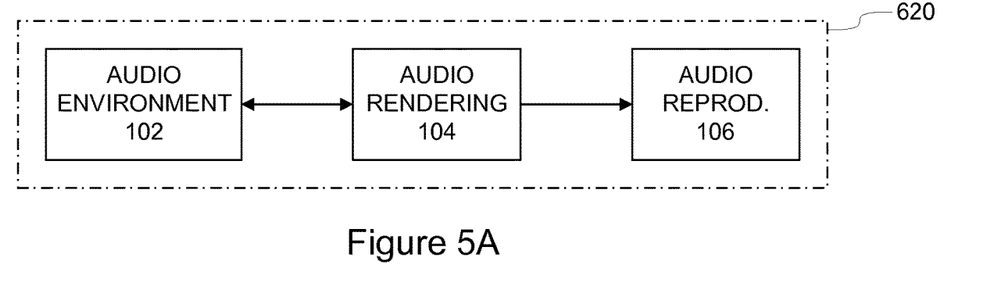
FIG. 5A illustrates a block diagram that depicts an arrangement of some logical entities of an audio signal rendering arrangement in a single device according to an example.

Referring back to the arrangements for rendering the sound field in a selected position of the virtual audio environment 102 depicted in FIGS. 1A and 1B, FIGS. 5A to 5C illustrate block diagrams that depict respective non-limiting examples of arranging elements depicted in FIGS. 1A and 1B into a number of devices. In this regard, FIG. 5A depicts an arrangement where the audio environment 102, the audio rendering engine 104 and the audio reproduction means 106 are arranged in a single device 620. The device 620 may be, for example, a laptop computer, a desktop computer, a television set, a game console or a home entertainment device of other type, etc. Herein, the audio environment 102 may be provided as information stored in one or more memories provided in the device 620, the audio rendering engine 104 may be provided a processor that executes a computer program stored in the memory, and the audio reproduction means 106 may be provided as a loudspeaker arrangement provided in the device 610.

Figure 5B:
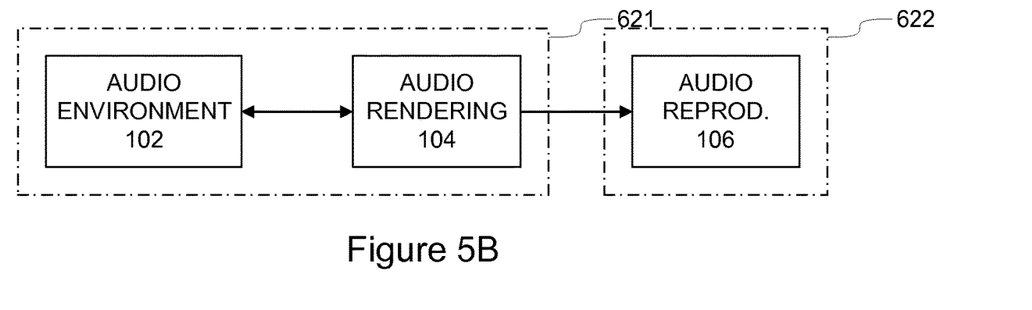
FIG. 5B illustrates a block diagram that depicts an arrangement of some logical entities of an audio signal rendering arrangement in two devices according to an example.

FIG. 5B depicts a variation of the arrangement of FIG. 5A, where the audio environment 102 and the audio rendering engine 104 are provided in a first device 621 and the audio reproduction means 106 is provided in a second device 622. Therein, the audio environment 102 and the audio rendering engine 104 may be provided as described above for the device 620, the first device 621 may likewise be provided e.g. as a laptop computer, as a desktop computer, as a television set, a game console or a home entertainment device of other type, etc. The second device 622 hosting the audio reproduction means 106 may comprise a loudspeaker arrangement or headphones connectable to the first device 621 by a wired or wireless communication link. In another scenario, the first device 621 may be provided as a mobile device such as a tablet computer, a mobile phone (e.g. a smartphone), a portable media player device, a portable gaming device, etc. whereas the second device 622 may be provided as headphones or a headset connectable to the first device 621 by a wireless or wired communication link. In a further scenario, the first device 621 may be provided as a server device (e.g. as an audio rendering server), while the second device 622 may be provided e.g. as headphones or headset provided with suitable wireless communication means that enable connection to the first device 621 via a communication network.

Figure 5C:
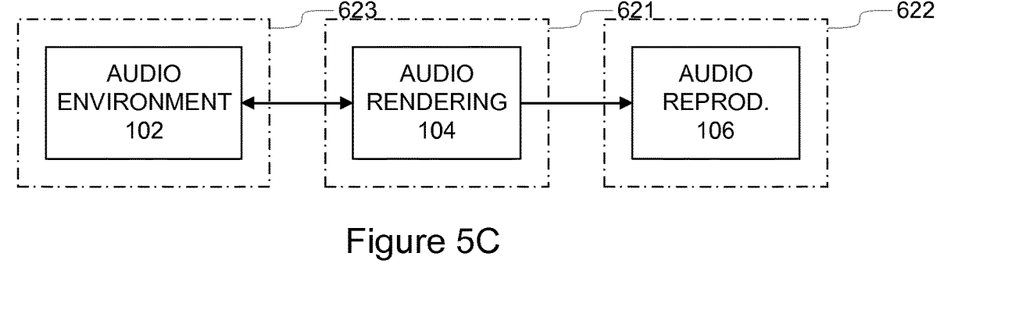
FIG. 5C illustrates a block diagram that depicts an arrangement of some logical entities of an audio signal rendering arrangement in three devices according to an example.

FIG. 5C depicts a variation of the arrangement of FIG. 5B, where the audio rendering engine 104 is provided in a first device 621, the audio reproduction means 106 is provided in a second device 622 and the virtual audio environment 102 is provided in a third device 623. The exemplifying scenarios outlined in the foregoing for the arrangement of FIG. 5B apply to the arrangement of FIG. 5C as well with the exception of the first device 621 being connectable to the third device 623 via a communication network to enable the audio rendering engine 104 to access the virtual audio environment 102 therein.

In some example embodiments there are provided connected interactions between audio objects of the virtual audio environment 102 e.g. in situations such as 6DoF audio source interactions so as to enable seamless interaction scenarios for audio objects, such as the ones that are isolated from desired or targeted audio content, to appear natural during audio playback in combination with audio content originating from audio objects that are directly being interacted by the user. Some example embodiments enable naturalness of interaction, when dealing with audio objects or sources of different types (the ones associated with interaction metadata and the ones are not associated with interaction metadata). It is understood that the embodiments of the present invention enable expectation of logical interaction responses without interaction metadata can be met, in particular for connected interactions, spanning, etc.

Figure 6:
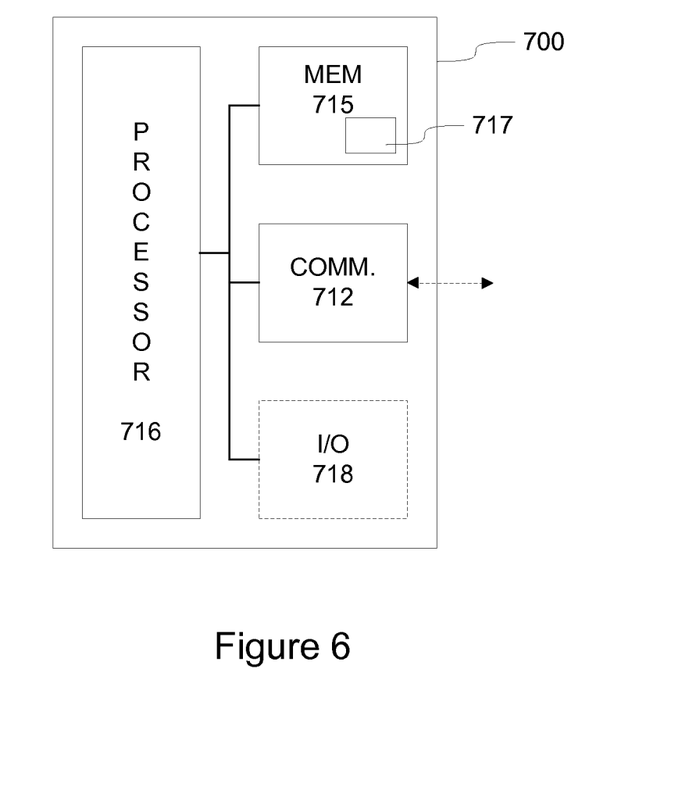
FIG. 6 illustrates a block diagram of some elements of an apparatus according to an example.

FIG. 6 illustrates a block diagram of some components of an exemplifying apparatus 700. The apparatus 700 may comprise further components, elements or portions that are not depicted in FIG. 6. The apparatus 700 may be employed e.g. in implementing the audio rendering engine 104.

The apparatus 700 comprises a processor 716 and a memory 715 for storing data and computer program code 717. The memory 715 and a portion of the computer program code 717 stored therein may be further arranged to, with the processor 716, to implement the function(s) described in the foregoing in context of the audio rendering engine 104.

The apparatus 700 comprises a communication portion 712 for communication with other devices. The communication portion 712 comprises at least one communication apparatus that enables wired or wireless communication with other apparatuses. A communication apparatus of the communication portion 712 may also be referred to as a respective communication means.

The apparatus 700 may further comprise user I/O (input/output) components 718 that may be arranged, possibly together with the processor 716 and a portion of the computer program code 717, to provide a user interface for receiving input from a user of the apparatus 700 and/or providing output to the user of the apparatus 700 to control at least some aspects of operation of the audio rendering engine 104 implemented by the apparatus 700. The user I/O components 718 may comprise hardware components such as a display, a touchscreen, a touchpad, a mouse, a keyboard, and/or an arrangement of one or more keys or buttons, etc. The user I/O components 718 may be also referred to as peripherals. The processor 716 may be arranged to control operation of the apparatus 700 e.g. in accordance with a portion of the computer program code 717 and possibly further in accordance with the user input received via the user I/O components 718 and/or in accordance with information received via the communication portion 712.

Although the processor 716 is depicted as a single component, it may be implemented as one or more separate processing components. Similarly, although the memory 715 is depicted as a single component, it may be implemented as one or more separate components, some or all of which may be integrated/removable and/or may provide permanent/semi-permanent/dynamic/cached storage.

The computer program code 717 stored in the memory 715, may comprise computer-executable instructions that control one or more aspects of operation of the apparatus 700 when loaded into the processor 716. As an example, the computer-executable instructions may be provided as one or more sequences of one or more instructions. The processor 716 is able to load and execute the computer program code 717 by reading the one or more sequences of one or more instructions included therein from the memory 715. The one or more sequences of one or more instructions may be configured to, when executed by the processor 716, cause the apparatus 700 to carry out operations, procedures and/or functions described in the foregoing in context of the audio rendering engine 104.

Hence, the apparatus 700 may comprise at least one processor 716 and at least one memory 715 including the computer program code 717 for one or more programs, the at least one memory 715 and the computer program code 717 configured to, with the at least one processor 716, cause the apparatus 700 to perform operations, procedures and/or functions described in the foregoing in context of the audio rendering engine 104.

The computer programs stored in the memory 715 may be provided e.g. as a respective computer program product comprising at least one computer-readable non-transitory medium having the computer program code 717 stored thereon, the computer program code, when executed by the apparatus 700, causes the apparatus 700 at least to perform operations, procedures and/or functions described in the foregoing in context of the audio rendering engine 104 (or one or more components thereof). The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

The invention claimed is:

1. A method for rendering a spatial audio signal that represents a sound field in a selectable viewpoint audio environment that includes one or more audio objects, wherein respective audio objects of the one or more audio objects are associated with respective audio content and a respective position in the selectable viewpoint audio environment, the method comprising:
   receiving an indication of a selected listening position and orientation in the selectable viewpoint audio environment;
   detecting an interaction concerning an audio object on basis of one or more predefined interaction criteria, wherein the audio object is associated with first interaction metadata comprising, at least, a definition of the one or more predefined interaction criteria;
   modifying, in response to said detected interaction concerning the audio object, the audio object;
   modifying, in response to said detected interaction concerning the audio object, one or more further audio objects, wherein the audio object is at least partially different from the one or more further audio objects, wherein the one or more further audio objects and the audio object are linked, wherein the modifying of the one or more further audio objects is further in response to the one or more further objects and the audio object being linked; and
   deriving the spatial audio signal that includes at least
      audio content associated with the modified audio object in a first spatial position of the sound field that corresponds to its position in the selectable viewpoint audio environment in relation to said selected listening position and orientation, and
      audio content associated with the modified one or more further audio objects in respective further spatial positions of the sound field that correspond to their positions in the selectable viewpoint audio environment in relation to said selected listening position and orientation.

2. A method according to claim 1, wherein said detecting comprises detecting an interaction between the audio object and said one or more further audio objects, wherein the rendering spatial audio signal is configured to change based on tracking a listening position in a real-world-space.

3. A method according to claim 1, wherein said detecting comprises detecting an interaction between the audio object and said selected listening position and/or the selected listening orientation, wherein the one or more predefined interaction criteria are configured to define an interaction between the audio object and the selected listening position and/or the selected listening orientation.

4. A method according to claim 3, wherein detecting the interaction between the audio object and the selected listening position and/or the selected listening orientation comprises applying one of the following interaction criteria:
  detecting a distance between the selected listening position and a position of the audio object is below a predefined threshold distance;
  detecting the distance between the selected listening position and the position of the audio object is below the predefined threshold distance and detecting the selected listening orientation is towards the position of the audio object;
  detecting a distance between the selected listening position and a position of a further audio object connected to the audio object is below the predefined threshold distance; or
  detecting the distance between the selected listening position and the position of the further audio object connected to the audio object is below the predefined threshold distance and detecting the selected listening orientation is towards the position of said further audio object.

5. A method according to claim 1, wherein the audio object is associated with respective metadata that includes a content part and a format part, wherein the content part comprises audio content and the format part comprises one or more rendering parameters that define desired rendering of the audio content in dependence of a position of the audio object in the selectable viewpoint audio environment in relation to said selected listening position and orientation.

6. A method according to claim 1, wherein said modifying the audio object and modifying the one or more further audio objects comprises:
  identifying a first modification to be applied to the audio object in response to said detected interaction;
  applying the first modification to the audio object;
  identifying the one or more further audio objects to be modified;
  identifying one or more further modifications to be applied to respective ones of the one or more further audio objects in response to said detected interaction; and
  applying the one or more further modifications to the respective ones of the one or more further audio objects.

7. A method according to claim 6, wherein said first modification and the one or more further modifications respectively comprises one of the following:
  activating one of the audio object or the one or more further audio objects;
  deactivating one of the audio object or the one or more further audio objects;
  changing the relative amplitude of the audio content originating from one of the audio object or the one or more further audio objects; or
  changing position of one of the audio object or the one or more further audio objects in the selectable viewpoint audio environment.

8. A method according to claim 1, wherein the one or more further audio objects are associated with respective further interaction metadata, wherein
  the first interaction metadata comprises a definition of a first modification to be applied to the audio object and an identification of a first further audio object of the one or more further audio objects, and
  first further interaction metadata associated with the first further audio object comprises a definition of a first further modification to be applied to the first further audio object.

9. A method according to claim 1, wherein the selectable viewpoint audio environment includes an audio control object that is associated with control metadata, wherein the one or more further audio objects are associated with respective further interaction metadata, wherein
  the control metadata comprises an identification of the audio object,
  the first interaction metadata comprises a definition of a first modification to be applied to the audio object and an identification of a first further audio object of the one or more further audio objects, and
  first further interaction metadata associated with the first further audio object comprises a definition of a first further modification to be applied to the first further audio object.

10. A method according to claim 8, wherein
  the first further interaction metadata comprises an identification of a second further audio object, and
  second further interaction metadata associated with the second further audio object comprises a definition of a second further modification to be applied to the second further audio object.

11. A method according to claim 1, wherein the first interaction metadata comprises
  a definition of a first modification to be applied to the audio object, respective identifications of the one or more further audio objects, and respective definitions of one or more further modifications to be applied to the respective one or more further audio objects.

12. A method according to claim 1, wherein the selectable viewpoint audio environment includes an audio control object that is associated with control interaction metadata and wherein the control interaction metadata comprises
  a definition of a first modification to be applied to the audio object, respective identifications of the one or more further audio objects, and respective definitions of one or more further modifications to be applied to the respective one or more further audio objects.

13. A method according to claim 1, wherein receiving the indication of the selected listening position and orientation comprises receiving user input that defines one or more of the following:
  a selected position in the selectable viewpoint audio environment,
  a change to a current position in the selectable viewpoint audio environment,
  a selected orientation in the selectable viewpoint audio environment with respect to one or more predefined reference directions; or
  a change to a current orientation in the selectable viewpoint audio environment with respect to the one or more predefined reference directions.

14. The method of claim 1, wherein the detecting of the interaction concerning the audio object is configured to cause modification of a connected interaction concerning the one or more further audio objects, wherein the modifying of the one or more further audio objects is further in response to the modified connected interaction.

15. An apparatus comprising at least one processor and at least one non-transitory memory including computer code for one or more programs, the at least one memory and the computer code configured, with the at least one processor, to cause the apparatus at least to:
   receive an indication of a selected listening position and orientation in an audio environment;
   detect an interaction concerning an audio object on basis of one or more predefined interaction criteria, wherein the audio object is associated with first interaction metadata comprising, at least, a definition of the one or more predefined interaction criteria;
   modify, in response to said detected interaction concerning the audio object, the audio object;
   modify, in response to said detected interaction concerning the audio object, one or more further audio objects, wherein the audio object is at least partially different from the one or more further audio objects, wherein the one or more further audio objects and the audio object are linked, wherein the modifying of the one or more further audio objects is further in response to the one or more further objects and the audio object being linked; and
   derive a spatial audio signal that includes at least
      audio content associated with the modified audio object in a first spatial position of a sound field that corresponds to its position in the audio environment in relation to said selected listening position and orientation, and
      audio content associated with the modified one or more further audio objects in respective further spatial positions of the sound field that correspond to their positions in the audio environment in relation to said selected listening position and orientation.

16. An apparatus according to claim 15, wherein the at least one memory and the computer code are configured, with the at least one processor, to cause the apparatus at least to render the spatial audio signal that represents a sound field in a selectable viewpoint audio environment that includes one or more audio objects, wherein respective audio objects of the one or more audio objects are associated with respective audio content and a respective position in the selectable viewpoint audio environment.

17. An apparatus according to claim 15, wherein the one or more further audio objects are associated with respective further interaction metadata, wherein
   the first interaction metadata comprises a definition of a first modification to be applied to the audio object and an identification of a first further audio object, and
   first further interaction metadata associated with the first further audio object comprises a definition of a first further modification to be applied to the first further audio object.

18. An apparatus according to claim 15, wherein the audio environment includes an audio control object that is associated with control metadata, wherein the one or more further audio objects are associated with respective further interaction metadata, wherein
   the control metadata comprises an identification of the audio object,
   the first interaction metadata comprises a definition of a first modification to be applied to the audio object and an identification of a first further audio object, and
   first further interaction metadata associated with the first further audio object comprises a definition of a first further modification to be applied to the first further audio object.

19. An apparatus according to claim 15, wherein the first interaction metadata comprises
   a definition of a first modification to be applied to the audio object, respective identifications of the one or more further audio objects, and respective definitions of one or more further modifications to be applied to the respective one or more further audio objects.

20. An apparatus according to claim 15, wherein the audio environment includes an audio control object that is associated with control interaction metadata and wherein the control interaction metadata comprises
   a definition of a first modification to be applied to the audio object, respective identifications of the one or more further audio objects, and respective definitions of one or more further modifications to be applied to the respective one or more further audio objects.

21. An apparatus according to claim 16, wherein the at least one memory and the computer code are configured, with the at least one processor, to cause the apparatus at least to:
   identify a first modification to be applied to the audio object in response to said detected interaction and apply the first modification to the audio object;
   identify the one or more further audio objects to be modified;
   identify one or more further modifications to be applied to respective ones of the one or more further audio objects in response to said detected interaction; and
   apply the one or more further modifications to the respective ones of the one or more further audio objects.

* * * * *